(12) United States Patent
Itoh et al.

(10) Patent No.: US 8,272,496 B2
(45) Date of Patent: Sep. 25, 2012

(54) TRANSFER DEVICE AND CONVEYOR EQUIPPED WITH THE SAME

(75) Inventors: Kazuo Itoh, Hyogo (JP); Yoichi Morimoto, Hyogo (JP); Tomonobu Hasegawa, Hyogo (JP); Kosuke Toda, Hyogo (JP)

(73) Assignee: Itoh Denki Co., Ltd. (JP)

( * ) Notice: Subject to any disclaimer, the term of this patent is extended or adjusted under 35 U.S.C. 154(b) by 132 days.

(21) Appl. No.: 12/658,389

(22) Filed: Feb. 8, 2010

(65) Prior Publication Data

US 2010/0213028 A1    Aug. 26, 2010

(30) Foreign Application Priority Data

Feb. 26, 2009 (JP) ................................. 2009-044852

(51) Int. Cl.
*B65G 47/53* (2006.01)
*B65G 47/64* (2006.01)

(52) U.S. Cl. .................. 198/370.1; 198/463.3

(58) Field of Classification Search .................. None
See application file for complete search history.

(56) References Cited

U.S. PATENT DOCUMENTS

| | | | | |
|---|---|---|---|---|
| 3,743,375 A | * | 7/1973 | De Fraeye | .................. 445/27 |
| 5,205,394 A | * | 4/1993 | Zeuschner | .................. 198/370.1 |
| 5,305,080 A | * | 4/1994 | Lee et al. | .................. 356/239.7 |
| 6,360,869 B1 | | 3/2002 | Itoh et al. | |
| 6,505,733 B2 | * | 1/2003 | Troupos et al. | .................. 198/809 |

FOREIGN PATENT DOCUMENTS

| | | |
|---|---|---|
| DE | 3109219 A1 | 7/1985 |
| JP | 59-153910 | 10/1984 |
| JP | 06-312832 | 11/1994 |
| JP | 2000-168948 | 6/2000 |

* cited by examiner

*Primary Examiner* — Kavel Singh
(74) *Attorney, Agent, or Firm* — Wood, Phillips, Katz, Clark & Mortimer

(57) ABSTRACT

A transfer device is configured by a conveying part and a lifting part both fixed to a casing. The conveying part forms a latticework by two groups of rollers aligned in a first direction and a second direction in matrix and includes chains for rotating the group of rollers aligned in the first direction and the group of rollers aligned in the second direction per group and driving devices for conveyance. The lifting part includes a driving device for lifting, rectilinearly-movable members for performing a rectilinear motion, and converting members for converting the rectilinear motion of the rectilinearly-movable member to a rotational motion and further to a lifting motion so as to transmit the lifting motion to the rollers. The converting members are arranged at the respective lattice points to lift up and down either group of rollers concurrently, which form a flat surface to convey articles.

16 Claims, 13 Drawing Sheets

TRANSFER DEVICE AND CONVEYOR EQUIPPED WITH THE SAME

BACKGROUND OF THE INVENTION

1. Field of the Invention

The present invention relates to a transfer device to be disposed in a conveyor line and being capable of changing a conveying direction of articles and a conveyor equipped with the same.

2. Description of the Related Art

Conveyors are often used to convey articles such as products and goods in assembly lines of products or in storage lines of goods in warehouses. In warehouse, for example, a number of conveyor lines are arranged in matrix with transfer devices disposed at positions where the conveyor lines intersect. Operation of a transfer device carries articles out of a main conveyor line and transfers to another conveyor line, so that the articles are conveyed to a desired destination.

Generally, such a transfer device includes a conveying part for conveying articles in a direction perpendicular to a conveyor line and a lifting part for lifting up and down the conveying part. Specifically, in a case of no need to change a conveying direction by the transfer device upon determination of a destination of an article being carried on the conveyor line by a device such as a sensor, a top surface of the conveying part for changing a conveying direction is put below a conveying surface of a main conveyor line so as to get out of the way of conveyance of the article carried on the main conveyor.

In contrast, in a case of a predetermined article to be changed in direction, the article is stopped on the transfer device by a stopper. Then, the top surface of the conveying part is raised above the conveying surface of the main conveyor line by operation of the lifting part, thereby lifting up the article. Thereafter, the conveying part is operated so as to transfer the article to another conveyor line.

Transfer devices disclosed in patent documents 1 and 2 specified below each employ a conveying part provided with belts. The transfer device disclosed in the patent document 1 includes two belts, which are looped in parallel and by which an article is lifted up. Then, the belts run to the same direction, so as to carry the article out of a main conveyor line in a direction perpendicular to the line.

The same can be said to the transfer device disclosed in the patent document 2. Five belts are looped in parallel and run to the same direction, thereby carrying an article out of a main conveyor line in a direction perpendicular to the line.

Patent Document

Patent Document 1: JP 6-312832 A

Patent Document 2: JP 2000-168948 A or U.S. Pat. No. 6,360,869, a counterpart application thereof

SUMMARY OF THE INVENTION

Problem to be Solved by the Invention

However, the transfer devices disclosed in the patent documents 1 and 2 each require a bulky driving device in the lifting part in order to convey heavy articles, resulting in increased height of the transfer device and accordingly increased height of the whole conveyor line. As a result, in placing articles on the conveyor line or in working in an assembly line, workers have sometimes felt uneasy.

More specifically, the transfer devices in the patent documents 1 and 2 use the belts looped in parallel to lift up an article slightly above a conveying surface of the conveyor line so as to transfer the article to another conveyor line. Therefore, the lifting part for lifting up the belts requires drive power for lifting up not only the conveying part but also the article placed on the belts. Consequently, a conveyor line for conveying heavy articles requires a driving device having large drive power in the lifting part of the transfer device. Herein, such a driving device having large drive power used in particular includes a large motor and a pneumatic or hydraulic actuator.

Further, it is often the case that transfer devices in the known art are generally configured to dispose a drive source for lifting, which forms a lifting part, below a conveying part.

More specifically, in order to employ a large motor in the transfer device in the known art, the whole transfer device inevitably increases in height for a size of the motor. Alternatively, in order to employ a pneumatic or hydraulic actuator therein, in view of the use of a piston motion of a cylinder as a lifting motion, the whole transfer device also inevitably increases in height for a total length of the cylinder and a tube in which the cylinder is housed. Consequently, the transfer device in the known art might need more space for the lifting part in order to convey heavy articles, resulting in increased height of the transfer device and accordingly increased height of the whole conveyor line. As a result, in placing articles on a conveyor line or in working in an assembly line, workers have sometimes felt uneasy.

Taking into account with the above-mentioned problem of the known art, the present invention therefore aims to provide a transfer device, which maintains the total height low so as to prevent increased height of a whole conveyor line even when the device is disposed in the conveyor line for conveying heavy articles, and a conveyor equipped with the same.

Means to Solve the Problem

An aspect of the present invention proposed herein to solve the above-mentioned problem is a transfer device including a conveying part having a plurality of rollers for conveying articles and a lifting part for lifting up and down the conveying part between an upper position and a lower position below the upper position, the rollers consisting of a first group of rollers and a second group of rollers, the first group of rollers being configured to convey articles in a first direction and the second group of rollers being configured to convey articles in a second direction intersecting with the first direction, so that the first and second groups of rollers are aligned in rows and columns to form a latticework, the rollers each being supported on shafts by its both ends at lattice points of the latticework, wherein the lifting part comprises a power source for lifting up and down, rectilinearly-movable members each performing a reciprocating rectilinear motion powered by the power source, and converting members arranged at the respective lattice points, the converting members each being configured to convert the rectilinear motion of the rectilinear-movable member to a rotational motion and to convert the rotational motion to a lifting motion so as to transmit the lifting motion to the rollers, and the converting members being configured to lift up and down the first group of rollers concurrently between the upper position and the lower position and to lift up and down the second group of rollers concurrently between the upper position and the lower position, so that the first group of rollers forms a flat surface when being positioned at the upper position and the second group of rollers form another flat surface when being positioned at the upper position.

Additionally, the first group of rollers and the second group of rollers are preferably aligned to intersect with each other.

Further, the rectilinearly-movable members may be powered by the power source directly or indirectly.

The transfer device in this aspect has the conveying part including a plurality of rollers and the lifting part for lifting up and down the rollers of the conveying part. The conveying part forms a latticework by the rollers aligned in the first direction and the rollers aligned in the second direction. Such an arrangement allows conveyance of articles to conveyor lines connected to the both groups of rollers aligned in the first and the second directions. Specifically, the device can be disposed at a position where the conveyor lines crisscross, thereby conveying an article to a desired conveyor line. More specifically, in the transfer device in this aspect, the power source for lifting is driven so that the lifting part makes the rollers aligned in a conveying direction, which is one selected from the first and the second directions, to come to the upper position. Those rollers that have been at the upper position are to convey an article. That generates a difference in height between the first and second groups of rollers so as not to obstruct each other, whereby an article is smoothly conveyed without being obstructed by the other group of rollers situated at the lower position.

Further, each roller rotates with supported on the shaft by its both ends at the lattice points. Thus, changing of intervals between the lattice points or length of the rollers enables to change a size of the device readily. In other words, a size of the transfer device can be changed based on a size of existing conveyor lines (width of conveyor lines). Consequently, there will be little increase in costs.

Further, in the transfer device in this aspect, the lifting part includes the rectilinearly-movable members each performing a reciprocating rectilinear motion powered by the power source and the converting members for converting the rectilinear motion to a rotational motion and further to a lifting motion so as to transmit the lifting motion to the rollers. Thus, there is no need to arrange the power source below the conveying part. Specifically, the converting members are arranged so as to perform the rotational motion in substantially the same plane as that including a track of the rectilinear motion of the rectilinearly-movable members. A planar cam is proposed as a member for converting the rotational motion to the lifting motion and for transmitting the converted lifting motion. The planar cam with a difference in height formed on its surface in a rotational direction is turned so as to lift up and down the ends of the rollers making use of the difference in height of the cam, thereby performing the lifting motion of the rollers. Consequently, the transfer device in this aspect has no need to arrange the power source, which is for performing the lifting motion of the rollers, below the conveying part.

Further, as described above, the transfer device in this aspect only requires a height of an area for arrangement of the lifting part to the extent that the rectilinearly-movable members and the converting members perform the respective motions, not requiring a height thereof to the extent that a member such as an actuator (conveying part) moves upwardly in a vertical direction. Specifically, a height of the area where the lifting part is arranged can be substantially the same thickness as either the rectilinearly-movable member or the converting member, whichever is thicker, in a case of employment of those members performing the motions in substantially the same plane. Therefore, the transfer device in this aspect has no need to arrange the power source below the conveying part as the known art described above and ensures space-saving of the lifting part, thereby avoiding an increased height of the device. Consequently, the transfer device in this aspect achieves a reduced height in total compared with transfer devices of the known art.

Further, the converting members employed in this aspect are arranged at the respective lattice points so as to lift up and down the respective rollers. Each group of rollers is concurrently lifted up and down, so that the rollers of either group form a flat surface when being at the upper position, and whereby articles are stably conveyed in either direction of the first or second direction.

As a consequence, the transfer device in this aspect avoids arrangement of the power source below the conveying part since having the converting members for converting the reciprocating rectilinear motion of the rectilinearly-movable members to the rotational motion and further to the lifting motion so as to transmit the lifting motion to the rollers. Thus, there is seldom any need for space for the lifting part below the conveying part, that is, the conveyor line avoids enlargement of its total height. That dispels the uneasiness of workers such as working in high places on conveyor lines or falling of articles associated with increased height of the lines in an assembly line using the lines for conveying high and heavy articles or a storage line in a warehouse. Further, the rollers forming the flat surfaces perform the lifting motion discretely in the first direction or in the second direction, thereby ensuring a stable conveyance even in a case of conveyance of an article in either direction. That ensures safer work.

In the transfer device in this aspect, it is preferable that the rollers of the both groups each have a main body and a shaft extending outwardly in an axial direction from both ends of the main body, the converting members each have a lifting-motion transmitting part supporting the shafts of the first and second groups of rollers, the lifting-motion transmitting parts each have a high-placed supporting part and a low-placed supporting part and being configured to turn with supporting the shafts of the rollers by one selected from the high-placed supporting part and the low-placed supporting part, and the rollers are positioned at the upper position when the shafts are supported by the high-placed supporting part and at the lower position when the shafts are supported by the low-placed supporting part, so that turning of the lifting-motion transmitting parts allows the shafts of one selected from the first and second groups of rollers to be supported by the low-placed supporting parts after the shafts of both the first and second groups of rollers have been supported by the high-placed supporting parts.

By such an arrangement, each roller has the main body and the shaft extending outwardly in the axial direction from the both ends of the main body. Each converting member has the lifting-motion transmitting part supporting the shafts, which part having the high-placed supporting part and the low-placed supporting part. The lifting-motion transmitting parts turn with supporting the shafts at the lattice points, so that the rollers aligned in either the first direction or the second direction come to the lower position due to the shafts of the rollers having moved to the low-placed supporting parts and that the rollers aligned in either the first direction or the second direction come to the upper position due to the shafts of the rollers having moved to the high-placed supporting parts. That is, by the transfer device in this aspect, turning of the lifting-motion transmitting parts with supporting the shafts ensures a lifting motion of the rollers of the conveying part.

Further, the shafts of the rollers aligned in either the first direction or the second direction come to the low-placed supporting parts by turning of the lifting-motion transmitting parts after the shafts of the rollers aligned in the both directions have been supported by the high-placed supporting parts. That lessens a load of the power source for lifting when changing of a conveying direction of an article. Because an article is transferred to a changed conveying direction when the shafts of the rollers aligned in the both directions are at the high-placed supporting parts, there is no need to lift up the article by the power source in order to change a conveying direction of the article either from the first direction to the second direction or vice versa. Thus, the power source for lifting employed in this aspect allows a relatively small drive power enough to lift up the conveying part on which no article is placed. Generally, such a power source is often of small dimensions. Therefore, because the power source for lifting can be arranged at the same level with the conveying part as long as being arranged at a position where the power source does not obstruct the rollers of the conveying part performing the lifting motion, the lifting part achieves more space-saving. That proves to reduce running cost due to a configuration by a small drive power.

In the transfer device in this aspect, it is preferable that the shafts each are provided with shaft bearings rotatable relative to the shaft and that the shaft bearings are each placed on the lifting-motion transmitting part so as to rotate along with turning of the lifting-motion transmitting part.

By such an arrangement, the shaft bearings are disposed on the shaft, so that the shaft and the shaft bearings rotate relative to each other. Further, because the shaft bearing is placed on the lifting-motion transmitting part so as to rotate along with the turning of the lifting-motion transmitting, the lifting-motion transmitting part has the least load in turning. That means the lifting-motion transmitting part readily turns substantially regardless of weights of the rollers and an article. Consequently, the shafts of the rollers are easy to move either from the high-placed supporting parts to the low-placed supporting parts or vice versa, and thus, smooth lifting motion of the rollers is performed.

In the transfer device in this aspect, it is preferable that the converting members each, further have a rotation converting part engaged with the rectilinearly-movable member and that the rotation converting part is configured to make a reciprocating pivot motion interlocked with the reciprocating rectilinear motion of the rectilinear-movable member with drawing an arcuate track around a center of the lifting-motion transmitting part, the pivot motion being performed in substantially the same plane as an imaginary plane including a track of the reciprocating rectilinear motion.

In such an arrangement, each converting member has the rotation converting part, which is engaged with the rectilinearly-movable member so as to pivot around the center of the lifting-motion transmitting part with drawing an arcuate track. Because the rotation converting part can be formed in a simple shape, for example, with extending outwardly from the lifting-motion transmitting part, production efficiency of members is increased. Specifically, for example, it is recommended that the rotation converting part and the lifting-motion transmitting part have a ladle-like shape as a whole, with a handle as the rotation converting part and a receptacle as the lifting-motion transmitting part. Further, because the arcuate track formed by the rotation converting part exists in substantially the same plane with that of the rectilinear motion of the rectilinearly-movable member, the lifting part can have a reduced height. That proves to lower the total height of the transfer device.

In the transfer device in this aspect, it is preferable that the power source is composed of a tubular body with a rotational shaft and a motor incorporated in the body so as to rotate the rotational shaft by driving of the motor and is situated at substantially the same level as the first and second groups of rollers of the conveying part.

Such an arrangement employs a roller incorporating a motor as the power source for lifting and being situated at substantially the same level as the rollers of the conveying part, thereby lowering the total height of the transfer device.

Preferably, the transfer device further includes a rack and pinion for converting a rotational motion powered by the power source to the rectilinear motion so as to output the rectilinear motion to the rectilinearly-movable member.

In the transfer device in this aspect, it is recommended that the rollers of the both groups each have a shaft with both ends each selected from: (1) an end located within an area of the lattice point; (2) an end communicating with an end of its adjacent roller belonging to the same row or the same column of the latticework across the lattice point; and (3) an end located out of the area of the lattice point, and that the shaft of each roller rotates in synchronization with the main body of the roller. Herein, "the area of the lattice point" denotes a predetermined range of area including the respective lattice point. Further, "an end communicating with the end of its adjacent roller" denotes that the end may be physically united or may be connected directly or via another body sandwiched therebetween.

In the transfer device in this aspect, some of the shafts of the rollers each preferably have a power transmission member for transmitting power having been transmitted to the roller to its adjacent roller, so that rotation of one roller in the first group upon power transmission rotates other rollers in the first group interlocked therewith via the power transmission members, and so that rotation of one roller in the second group upon power transmission rotates other rollers in the second group interlocked therewith via the power transmission members.

By such an arrangement, because rotation of one roller in each group upon power transmission allows other rollers in said group to rotate interlocked therewith via the power transmission members, small power enables to rotate each group of rollers in a unified manner. That reduces production cost and running cost and simultaneously enables smooth conveyance of articles to a desired conveying direction.

In the transfer device in this aspect, it is recommended that the power transmission member is a sprocket, that at least a pair of adjacent rollers has the sprockets respectively, and that a power-transmitting chain is looped over the sprockets.

Preferably, the transfer device in this aspect further has holding covers for covering the lifting-motion transmitting parts, the holding covers each having a guide for guiding the rollers to move in a lifting direction.

By such an arrangement, the holding cover covers the lifting-motion transmitting part and is simultaneously provided with a guiding function for guiding the rollers to move in a lifting direction. Thereby, the rollers smoothly perform a lifting motion without misalignment of the shafts from the lattice points.

Preferably, the transfer device in this aspect further has base members arranged in the lattice points respectively, the base members each having a thrust bearing for horizontally turnably supporting the converting member and a shaft holder for holding the shaft of the roller.

By such an arrangement, the base members are arranged in the lattice points respectively and each have a horizontally turnable thrust bearing, thereby allowing the converting members to turn in a thrust direction. In other words, the converting members are allowed to move in substantially the same plane as the rectilinear motion of the rectilinearly-movable members. Further, the base members include the shaft holders respectively, so as to prevent the shafts from displacement or misalignment.

Preferably, the transfer device in this aspect further has a power source for conveyance for outputting drive power to the rollers, the power source for conveyance being configured to rotate at least one roller of one selected from the first and second groups.

The transfer device is preferably configured to stop outputting the power to the rollers from the power source for conveyance at least during driving of the power source for lifting.

Another aspect of the present invention is a conveyor including a plurality of conveyor lines branched at a branch point, a controller for controlling conveyance by the conveyor lines, a sensor for sensing conveyance information of articles on the conveyor lines, and the transfer device as described above and arranged at the branch point of the conveyor lines.

"Conveyance information" as referred herein denotes information such as existence or nonexistence of an article and a conveying destination of an article.

The conveyor in this aspect has a configuration in which the transfer device as described above is arranged at a branch point of a plurality of conveyor lines branched at the branch point. The transfer device employed in the conveyor in this aspect has no need to arrange the lifting part below the conveying part. There is no need to increase the conveyor line in height. Therefore, this aspect can provide the conveyor that dispels the uneasiness of workers such as working in high places on a conveyor line or falling of articles in an assembly line of products or in a storage line in a warehouse even when being employed in a conveyor line for conveying high and heavy articles.

Advantageous Effect of the Invention

The transfer device and the conveyor equipped with the same in the present invention have no need to arrange the lifting part below the conveying part even when being employed in a conveyor line for conveying high and heavy articles. That avoids increased height of the conveyor line. Consequently, the present invention dispels the uneasiness of workers in placement of high and heavy articles on a conveyor line or in assembly work on a conveyor line.

BRIEF DESCRIPTION OF THE DRAWINGS

FIG. 13A is a plan view thereof and FIG. 13B is a side view thereof;

FIG. 14A is a plan view thereof and FIG. 14B is a side view thereof;

FIG. 15A is a plan view thereof and FIG. 15B is a side view thereof;

FIG. 16A is a plan view thereof and FIG. 16B is a side view thereof.

DESCRIPTION OF THE PREFERRED EMBODIMENTS

Figure 1:
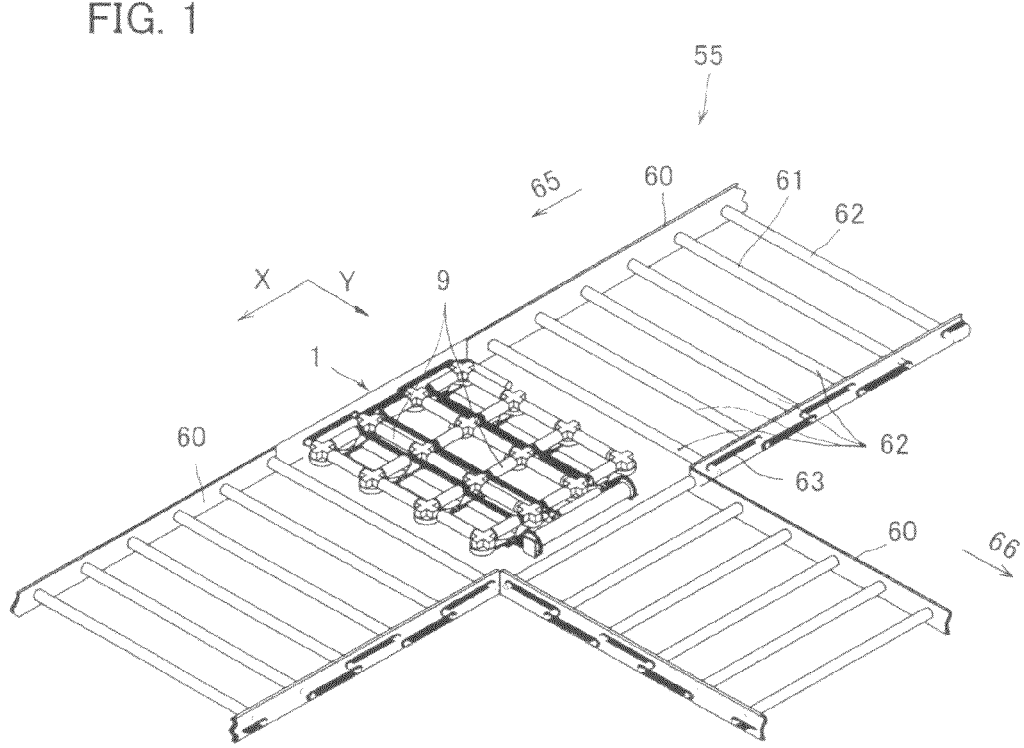
FIG. 1 is a perspective view of a conveyor equipped with a transfer device of an embodiment of the present invention.

Now, a preferred embodiment of the present invention will be described below, making a reference to the accompanying drawings. In the following description, unless otherwise noted, a conveying direction of a main conveyor line 65 shown in FIG. 1 is designated as an X (first) direction and a conveying direction of a subsidiary conveyor line 66 is designated as a Y (second) direction. Further, rollers for conveying articles in the X (first) direction are designated as an X (first) group of rollers 19 and rollers for conveying articles in the Y (second) direction are designated as a Y (second) group of rollers 20.

A transfer device 1 in this embodiment is, as shown in FIG. 1, disposed at a position where the conveyor lines 65 and 66 intersect and constituted by rollers 9 aligned in the X direction and rollers 9 aligned in the Y direction so that both the rollers 9 form a latticework. The transfer device 1 is controlled by a controller (not shown) so as to convey articles (90 in FIGS. 13A to 16B) from the main conveyor line 65 to the subsidiary conveyor line 66 or to the main conveyor line 65 without changing the line. Herein, the main conveyor line 65 and the subsidiary conveyor line 66 each are constituted by a plurality of conveyor units 60, each of which is configured so that one roller 61 incorporating a motor and four driven rollers 62 rotate interlocked with one another via a chain 63. The conveyor unit 60 adjacent to and upstream of the transfer device 1 is provided with a sensor (not shown) for reading information such as a conveying destination stored in a tag (not shown) attached to an article.

Figure 2:
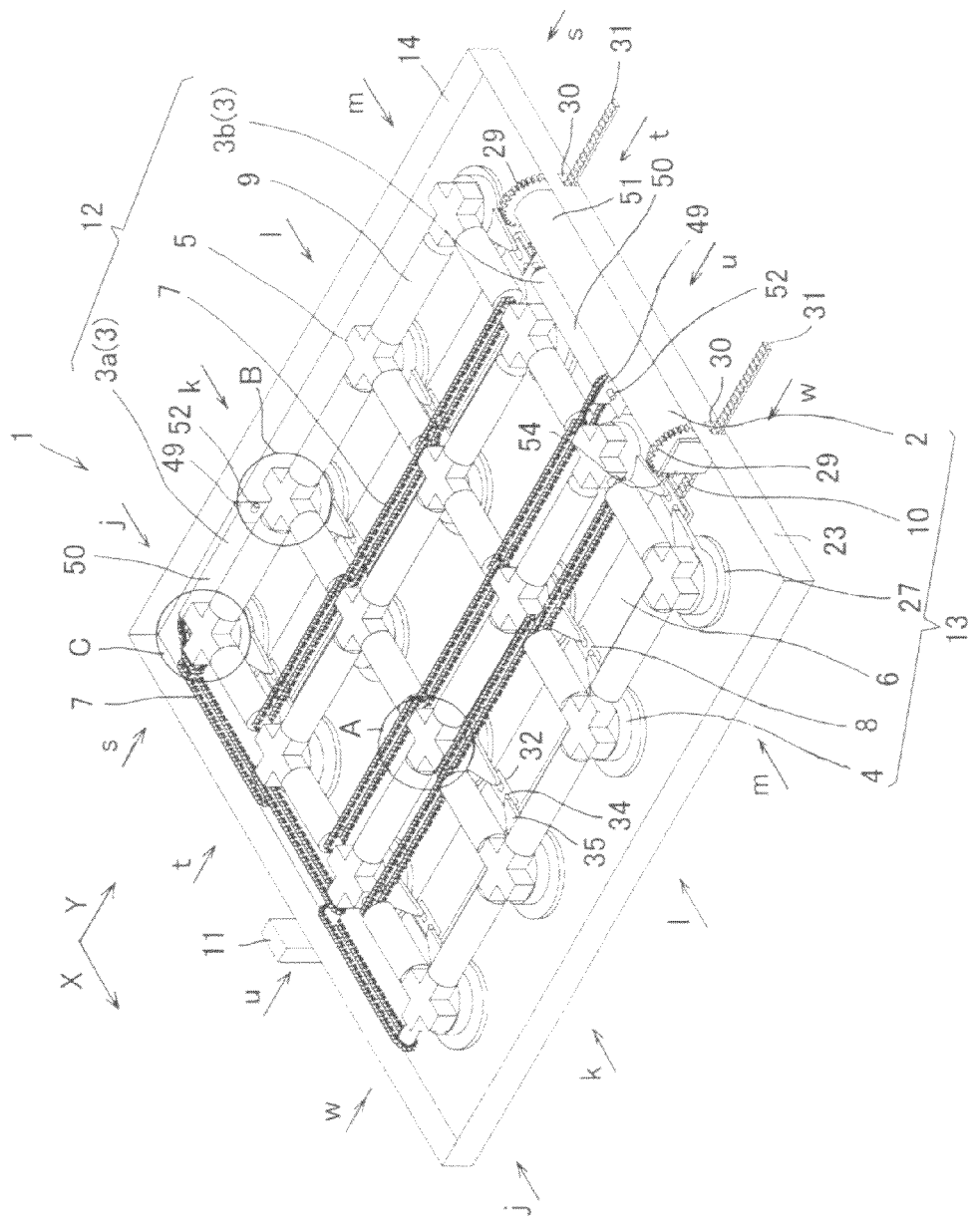
FIG. 2 is a perspective view of the transfer device.

The transfer device 1 in this embodiment, as shown in FIG. 2, mainly consists of a conveying part 12, a lifting part 13, and an open-topped casing 14 to which the parts 12 and 13 are fixed.

The casing 14 is made of metal and capable of securing the conveying part 12 and the lifting part 13 visibly through the open top of the casing 14. The casing 14 has two insertion holes 30 formed on a side 23 to which the subsidiary conveyor line 66 is connected, in the insertion holes 30 parts of racks and pinions 10 described later being inserted. Further, the casing 14 is provided with a presence sensor 11 (FIG. 2) at a side to which any conveyor line is not connected, as shown in FIG. 1. Consequently, the sensor (not shown) provided in the conveyor unit 60 adjacent to and upstream of the transfer device 1 reads a conveying direction of an article and further the presence sensor 11 provided in the casing 14 of the transfer device 1 detects the article, thereby ensuring a controlled conveyance by the controller (not shown).

Figure 3:
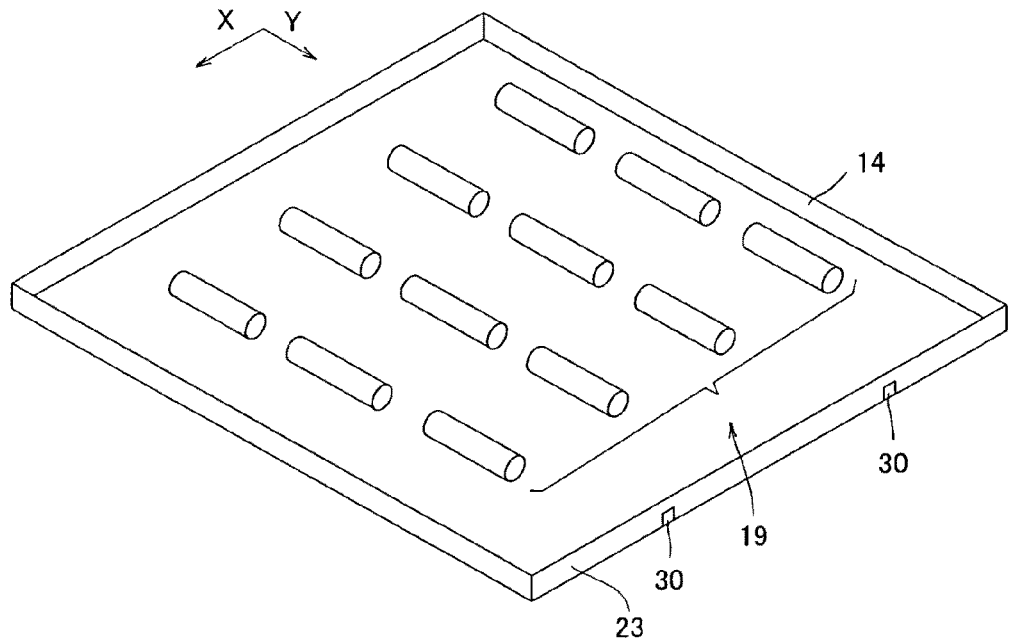
FIG. 3 is a perspective view showing a first group of rollers aligned in a first (X) direction.
Figure 4:
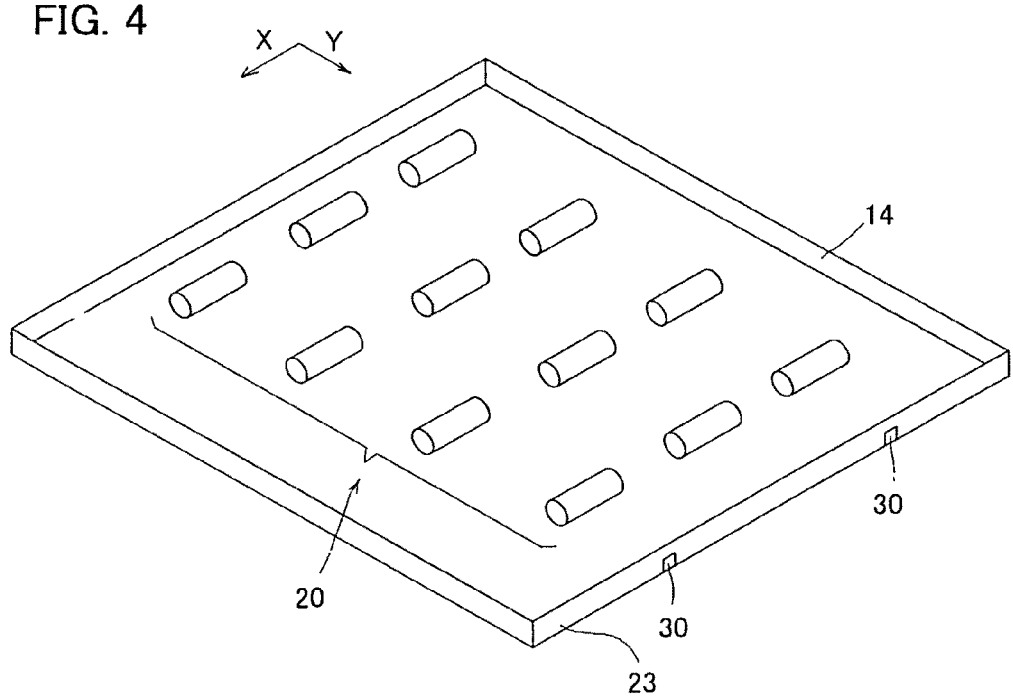
FIG. 4 is a perspective view showing a second group of rollers aligned in a second (Y) direction.

The conveying part 12 mainly consists of rollers 9 aligned in rows and columns to form a latticework, driving devices (driving sources) for conveyance 3 for rotating the rollers 9, chains 7 for interlocking a plurality of rollers 9 so as to rotate the interlocked rollers 9, and holding covers 5 each for rotatably holding ends of each roller 9. Specifically, the conveying part 12 is formed by the first (X) group of rollers 19 aligned in four rows and three columns and including twelve rollers in total as shown in FIG. 3 and the second (Y) group of rollers 20 aligned in three rows and four columns and including twelve rollers in total as shown in FIG. 4. Each group of rollers 9 interlocked with one another by the chains 7 is rotated by the driving source 3a or 3b, thereby conveying an article having been conveyed from upstream of the conveyor line to either the X or Y direction. The X and Y groups of rollers 19 and 20 each form a flat surface, so as to convey articles in a desired direction. In order to make the following description clear, the rows of the rollers 9 aligned for conveyance in the X direction are designated as a row "s", a row "t", a row "u", a row "w" in order from upstream and the columns of the rollers 9 aligned for conveyance in the Y direction are designated as a column "j", a column "k", a column "l", a column "m" in order from upstream.

Figure 5:
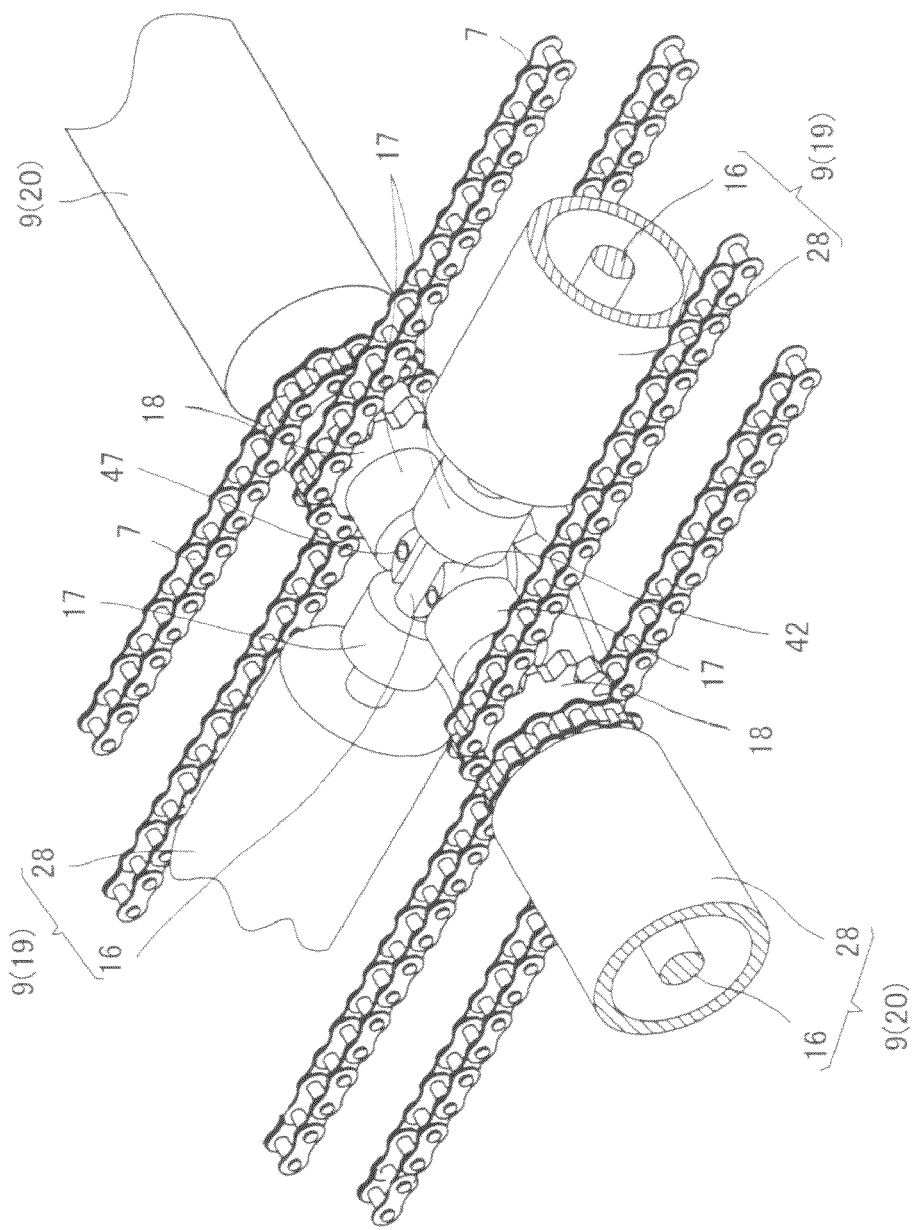
FIG. 5 is an enlarged perspective view of an area A of the transfer device shown in FIG. 2 without a holding cover.

Each of the rollers 9, as shown in FIG. 5, has a tubular body (main body) 28 made of metal, lids (not shown) disposed at both ends of the tubular body 28 and rotating integrally with the tubular body 28, and a shaft 16 secured to the lids. Shortly, the tubular body 28 and the shaft 16 integrally rotate. The shaft 16 has an outer diameter smaller than an inner diameter of the roller 9 and is positioned on a central axis of the roller 9. The shaft 16 further has distal ends extending out of the ends (lids) of the roller 9 and positioned at lattice points where the rollers 9 aligned in the X direction intersect with the rollers 9 aligned in the Y direction. Hereinafter, each lattice point is identified by a symbol consisting of a combination of numerals of the row and the column belonging to the point. For example, a lattice point where the row "s" intersects with the column "k" is designated as a lattice point "sk".

Figure 6:
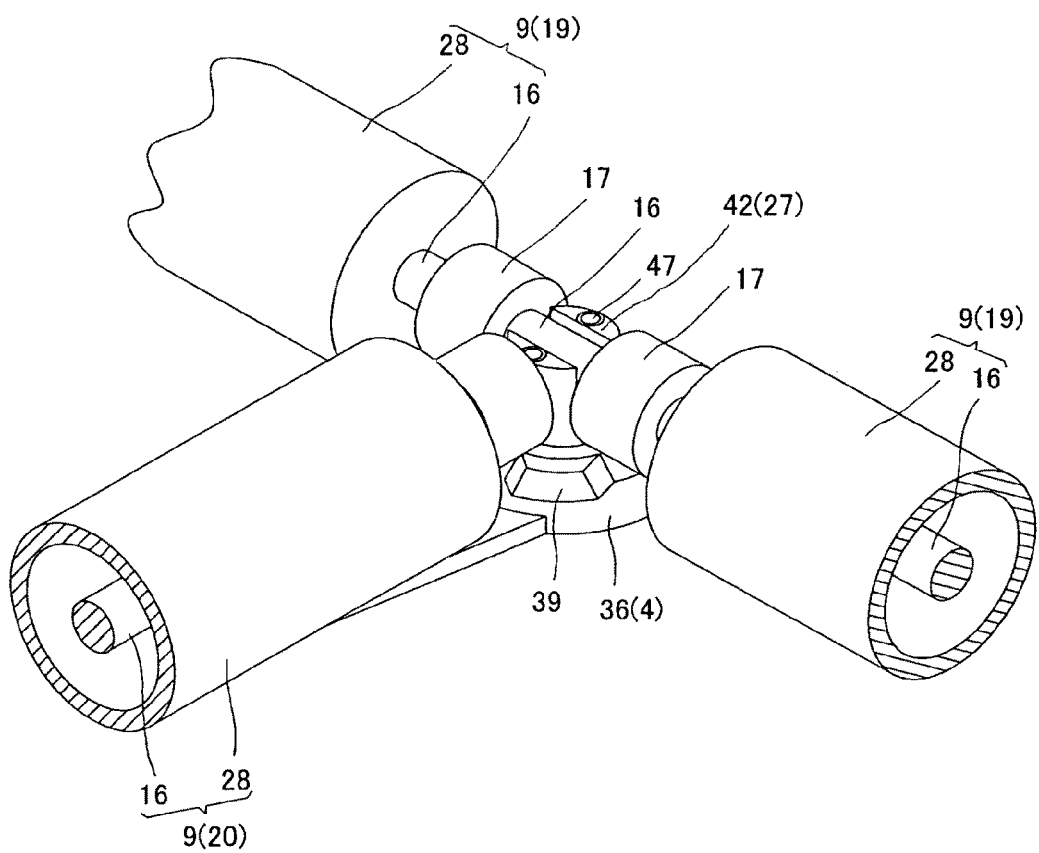
FIG. 6 is an enlarged perspective view of an area B of the transfer device shown in FIG. 2 without the holding cover.
Figure 7:
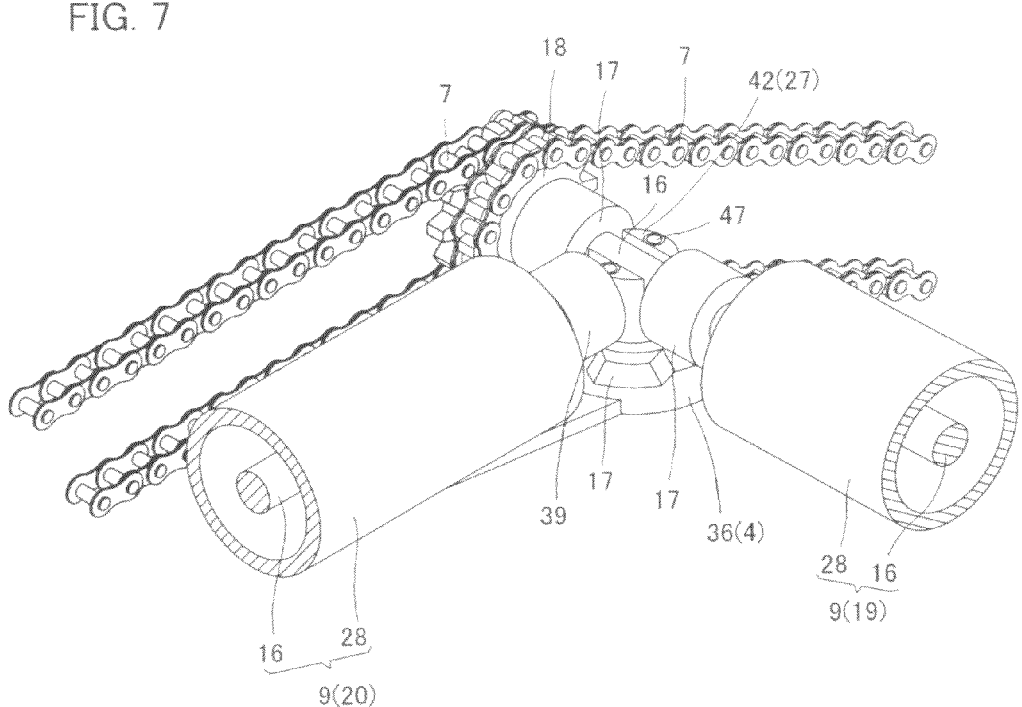
FIG. 7 is an enlarged perspective view of an area C of the transfer device shown in FIG. 2 without the holding cover.

The distal ends of each shaft 16, as shown in FIGS. 5 to 7, are composed of one with only a shaft bearing 17 and one with not only the shaft bearing 17 but also dual sprockets (power transmitting members) 18 between the end (lid) of the tubular body 28 of the roller 9 and the shaft bearing 17. The shafts 16 of the X and Y groups of rollers 19 and 20 have any of shapes illustrated in FIGS. 5 to 7.

More specifically, as shown in FIGS. 2 and 5, the rollers 9 constituting the Y group 20 each has the shaft 16 having one distal end provided with the shaft bearing 17 and the sprockets 18 and the other distal end provided with only the shaft bearing 17. The rollers 9 constituting the Y group 20 except for some each have a length, which is from the end (lid) of the tubular body 28 of the roller 9 to the distal end of the shaft 16, enough to fall within an area of the lattice point when the shaft 16 is placed in the lattice point. The "area of the lattice point" denotes herein a defined area including the lattice point. Specifically, the area denotes an area where a lifting-motion transmitting part 36 described later is located.

In contrast, the rollers 9 constituting a part of the Y group 20 each has the shaft 16, which is of the same configuration as that of each roller 9 of the X group 19 shown in FIGS. 5 and 6, having the distal ends of any adjacent shafts 16 in columns being communicated with each other. Shortly, the shafts 16 of the adjacent rollers 9 are connected to each other across the lattice point. In the transfer device 1 in this embodiment, only the rollers 9 in the column "m" each have the shaft 16 whose distal end is communicated with the distal end of its adjacent shaft 16. That is, the distal ends of the shafts 16 each provided with the sprockets 18 and the shaft bearing 17 are communicated with each other at the lattice point "um", whereas the distal end of the shaft 16 provided with the sprockets 18 and the shaft bearing 17 is communicated with the distal end of the shaft 16 provided with only the shaft bearing 17 at the lattice point "tm". Therefore, the adjacent rollers 9 having the shafts 16 whose distal ends are communicated with each other rotate in synchronization. Herein, the rollers 9 constituting the Y group 20 have the sprockets 18 aligned in the same Y direction. Consequently, the chains 7 are looped over the sprockets 18 aligned in the Y direction, thereby rotating the rollers 9 aligned in the same Y direction interlocked with one another.

Further, as shown in FIG. 5, in the X group of rollers 19, the distal ends of the shafts 16 of the adjacent rollers 9 in the Y direction except for some, specifically those at the lattice points "sk", "sl", "tk", "tl", "uk", "ul", "wk", and "wl", are communicated with each other and each have only the shaft bearing 17.

In contrast, the distal ends of the shafts 16 located at the lattice points "sm", "tm", "um", and "wm" each have only the shaft bearing 17 and are located within the areas of the lattice points respectively. In other words, none of the shafts 16 located at the lattice points "sm", "tm", "um", and "wm" is communicated with an adjacent shaft, because there is no adjacent shaft to be communicated therewith. The distal ends of the shafts 16 located at the lattice points "sj", "tj", "uj", and "wj" are out of the areas of the lattice points respectively. There are provided two shaft bearings 17 within the area of the respective lattice point and the sprockets 18 on the distal end out of the area. That is, the shaft bearings 17 are arranged within the area, one being near the roller 9 and one being near the sprockets 18.

The driving devices 3a and 3b for conveyance each are the known roller incorporating a motor and have a driving motor (not shown) incorporated within a tubular body (main body) 50 and a central shaft 52 extending from both ends. The central shaft 52 is supported unrotatably by fixing members 49, which are in turn fixed to the casing 14. The fixing members 49 each have a hole with substantially the same diameter as that of the central shaft 52, which is inserted in and supported by the holes. The tubular body 50 rotates relative to the central shaft 52.

The tubular body 50 has one end provided with a lid (not shown) rotating in synchronization with the tubular body 50, the lid having dual sprockets (not shown). A chain 7 looped over the sprocket (not shown) and the sprocket 18 on the shaft 16 of the roller 9 transmits a rotational motion of the driving device 3 (3a, 3b) to the roller 9.

In the transfer device 1 in this embodiment, the driving device 3a is arranged in parallel with and outside of the row "s" and also arranged so that the sprocket (not shown) of the driving device 3a is interlocked with rotation of the sprocket 18 near the column "j" of the roller 9 of the X group 19. Meanwhile, the driving device 3b is arranged in parallel with and outside of the column "m" and also arranged so that the sprocket (not shown) of the driving device 3b is interlocked with rotation of the sprocket 18 near the column "m" of the roller 9 of the Y group 19. Herein, the chains 7 are looped over the sprockets (not shown) and the sprockets 18 respectively so as to transmit a rotational motion.

Figure 8:
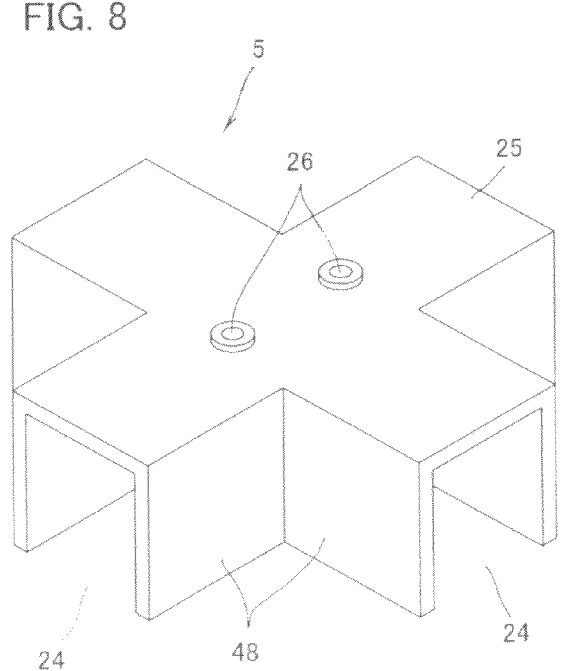
FIG. 8 is a perspective view of the holding cover.

The holding cover 5 is, as shown in FIG. 8, a casing with a top face 25 of a cross shape in a planar view and with a bottom face and four extending side faces being open. The bottom face of the holding cover 5 forms a reversed channel-like cavity 24 of a cross shape defined by the side faces (guiding parts 48) extending vertically from the top face 25 to the bottom face. The reversed channel-like cavity 24 has a width and a height for the above-mentioned shaft bearing 17 to fit in. Positioning of the holding covers 5 at the respective lattice points holds the shaft bearings 17 of the shafts 16 and allows the rollers 9 to smoothly move in a lifting (vertical) direction. In other words, the holding covers 5 hold the both ends of the rollers 9, thereby allowing stable rotation of the rollers. Further, the top face 25 has vertically-penetrating fixing holes 26 in alignment and adjacent to a center of the face 25. The holding cover 5 is fixed via the fixing holes 26 to a base member 27 of the lifting part 13 described later.

The lifting part 13 includes a driving device (power source) 2 for lifting, the known racks and pinions 10 for converting a rotational motion of the driving device 2 to a rectilinear motion, rectilinearly-movable members 6 to which the rectilinear motion is transmitted, converting members 4 for converting the rectilinear motion to a rotational motion, and the base members 27 each for holding rotatably the converting member 4.

The driving device 2 is the known roller incorporating a motor and has a driving motor (not shown) incorporated within a tubular body (main body) 51 and a central shaft (not shown) extending from both ends. The central shaft is supported unrotatably by fixing members 54, which are in turn fixed to the casing 14. The fixing members 54 each have a hole with substantially the same diameter as that of the central shaft, which is inserted in and supported by the holes. The tubular body 51 rotates relative to the central shaft.

The tubular body 51 has both ends provided with lids (not shown) rotating in synchronization with the tubular body 51, the lids each having a gear (pinion) 29. The gear 29 is the known rack and pinion 10 used with a toothed bar (rack) 31, so as to convert a rotational motion of the motor to a rectilinear motion. Repetition of normal and inverse rotations of the gear 29 outputs reciprocating rectilinear motion by the rack and pinion 10. The driving device 2 is disposed inside the side 23 having the insertion holes 30, through which one ends of the bars 31 protrude outside. The other ends of the bars 31 are respectively connected to the rectilinearly-movable members 6 described later.

The rectilinearly-movable member 6 is a belt-like plate with a length of substantially four lattice points aligned in the Y direction, performing the same motion as that of the bar 31 of the rack and pinion 10. Specifically, the rectilinearly-movable member 6 has one end connected to the other end of the bar 31, so as to receive the reciprocating rectilinear motion. The rectilinearly-movable member 6 further has four plate-engaging parts 32 each of a rectangular concave shape, to each of the engaging parts 32 a holding plate 8 for holding the converting member 4 described later is placed.

Figure 9:
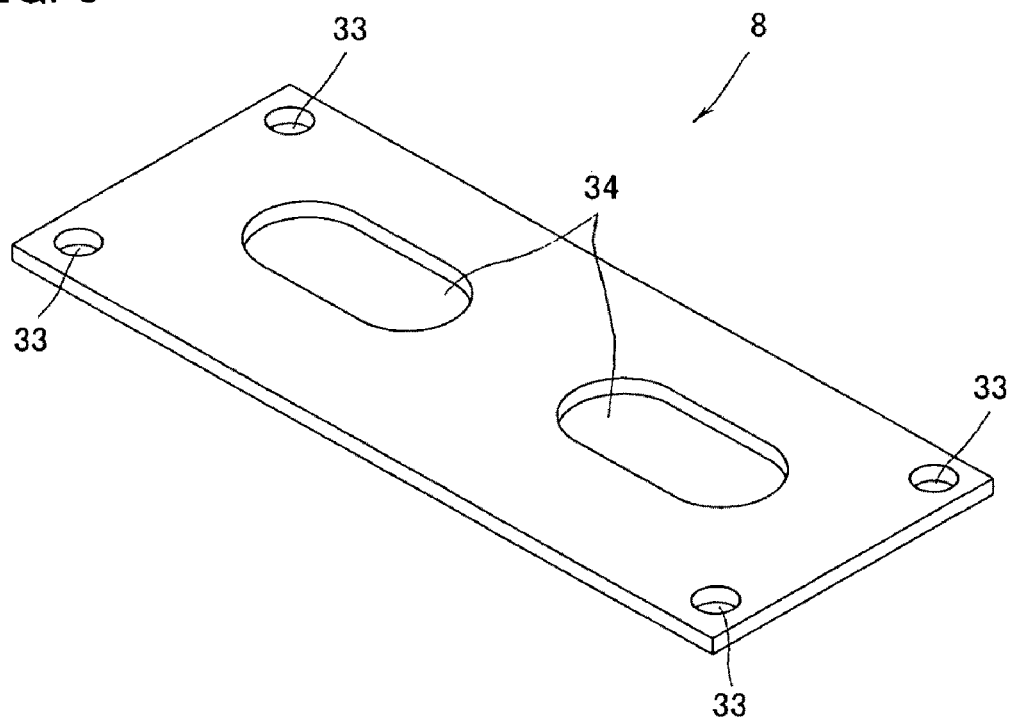
FIG. 9 is a perspective view of a holding plate.

Referring to FIG. 9, the holding plate 8 is a rectangular plate made of resin and has four fixing holes 33 at corners and two holding holes 34 each for holding the converting member 4. The holding plates 8 are fitted in the respective engaging parts 32 and fixed to the rectilinearly-movable members 6 by connecting means such as bolts inserted in the fixing holes 33. The holding holes 34 each has a running track-like shape combining a square with semi-circular arcs. An insertion hole 37 formed in a rotation converting part 35 of the converting member 4 described later is arranged in communication with the holding hole 34 and connected thereto by a connecting means such as a bolt. The engaging part 32 has fixing holes (not shown) and holding holes (not shown) at substantially the same position as the fixing holes 33 and the holding holes 34 of the holding plate 8, which are arranged so as to be communicated with those holes (not shown).

Figure 10:
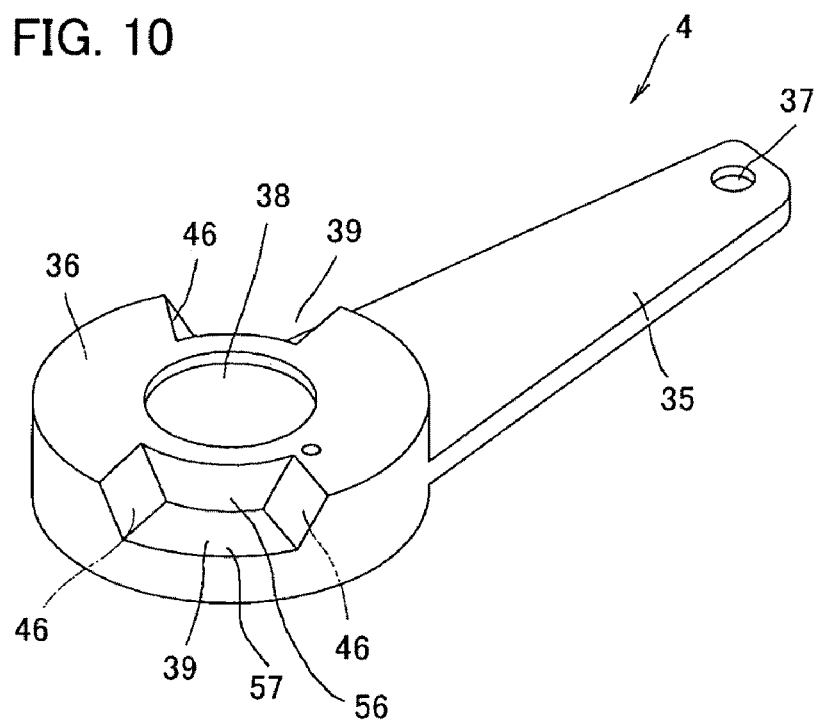
FIG. 10 is a perspective view of a converting member.

Referring to FIG. 10, the converting member 4 is made of metal and constituted by the lifting-motion transmitting part 36 of a circular shape, With which the shaft bearing 17 of the roller 9 contacts, and the rotation converting part 35 of a substantially trapezoidal shape and connected to the part 36. The rotation converting part 35 is of a plate shape with an insertion hole 37 penetrating in a thickness direction near its distal end. The converting member 4 is arranged in such a manner that the insertion hole 37 is communicated with the holding hole 34 of the holding plate 8 and the holding hole (not shown) of the rectilinearly-movable member 6 and attached to the holding plate 8 and the rectilinearly-movable member 6 by a connecting means such as a bolt. At this time, the rotation converting part 35 is attached so as to move relative to the holding plate 8 and the rectilinearly-movable member 6, instead of rendering the rotation converting part 35 immovable relative to the holding plate 8 and the rectilinearly-movable member 6.

The lifting-motion transmitting part 36 has a holding hole 38 penetrating therethrough in its center, in which a part of the base member 27 described later is inserted. The lifting-motion transmitting part 36 has two recesses (low-placed supporting parts) 39 dented on a top face and formed at opposed positions across the holding hole 38. The recesses 39 each are defined by three side faces 46, 46, and 56 and a bottom face 57 and open at one side face of a cylindrical shape and at the top face. Opposing side faces 46 and 46 among the side faces are to be inclined surfaces 46 and 46 with climb gradient in a direction apart from each other. Herein, two portions of the top face other than the recesses 39 are high-placed supporting parts contrary to the recesses (low-placed supporting parts) 39.

The two recesses 39 are, as described above, arranged diametrically across the center of the lifting-motion transmitting part 36 and each have a sector angle in a circumferential direction at 30 to 50 degrees, preferably at 40 degrees. In other words, the two high-placed supporting parts each have a sector angle at 130 to 150 degrees, preferably at 140 degrees. The lifting-motion transmitting parts 36 turn so as to generate rotation angles to allow the X group of rollers 19 and the Y group of rollers 20 to be on the same level. More specifically, the rollers 9 of the X group 19 and the Y group 20 have substantially an angular separation at each lattice point and the sector angles of the high-placed supporting parts are larger than 90 degrees, and whereby the both X and Y groups of rollers 19 and 20 can be on the same level at a position of the high-placed supporting parts (upper position). Therefore, the transfer device 1 in this embodiment has no need to lift up and down an article even when changing a conveying direction of the article since the article is transferred at the upper position of the both X and Y groups 19 and 20. Consequently, it is only necessary to give the driving device 2 a drive power enough to lift up and down the rollers 9 of the X and Y groups 19 and 20.

Figure 11:
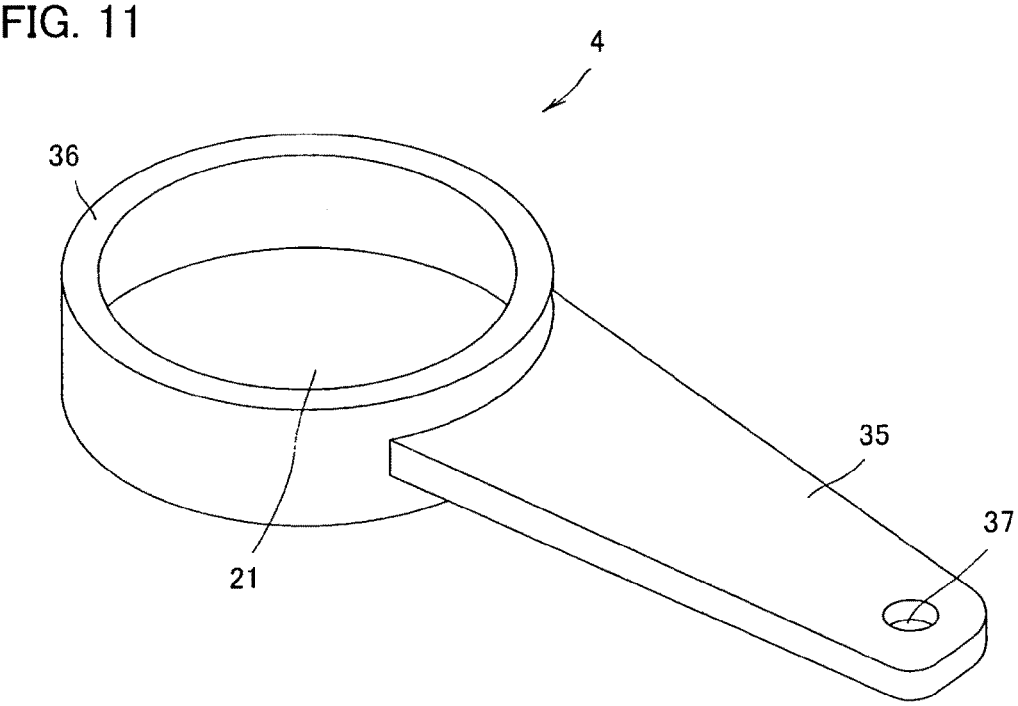
FIG. 11 is a perspective view of a bottom face of the converting member.

As to a positional relationship between the rotation converting part 35 and the recesses 39, if the recesses 39 might be arranged so as to come to substantially top and bottom in the figure as shown in FIG. 10, a distal end of the rotation converting part 35 would be inclined upwardly at about 30 degrees to a horizontal line so that a part of a proximal end of the rotation converting part 35 hangs over a part of the recess 39 that comes to top in the figure. Clockwise turning of the lifting-motion transmitting part 36 by 60 degrees from the state shown in FIG. 10 would make the recesses 39 to come to substantially right and left in the figure and the rotation converting part 35 to be inclined downwardly at about 30 degrees to the horizontal line. As shown in FIG. 11, the lifting-motion transmitting part 36 has a bottom face with a circular recess 21, in which a part of the base member 27 described later is fitted.

Figure 12:
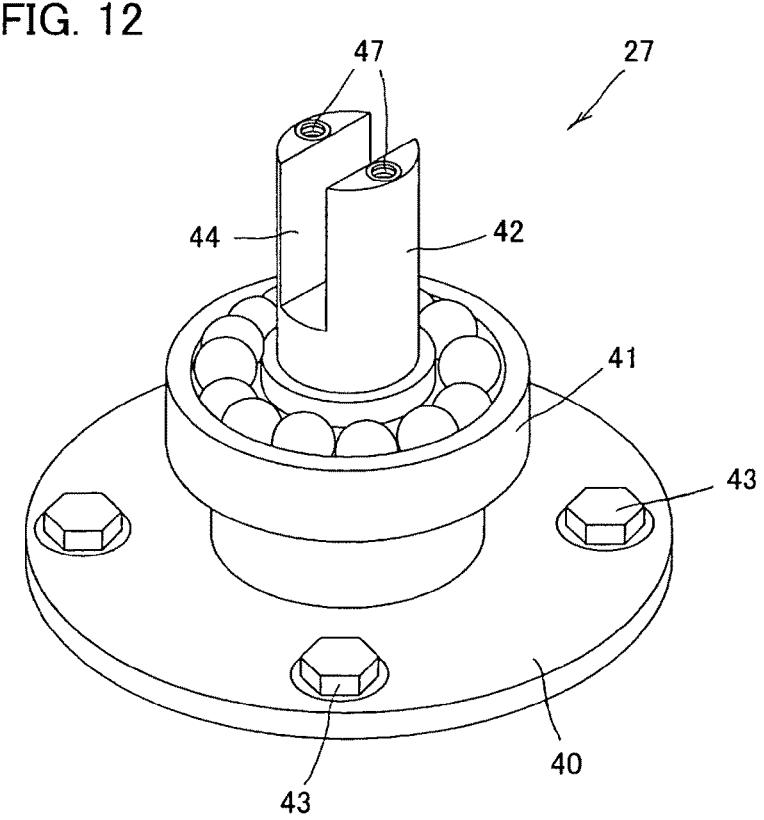
FIG. 12 is a perspective view of a base member.

The base member 27 is arranged at each lattice point and, as shown in FIG. 12, is of an integrated structure consisting essentially of a circular flange 40, a thrust bearing 41, and a shaft holder 42. The thrust bearing 41 is for being fitted in the circular recess 21 formed at the bottom face of the converting member 4. The shaft holder 42 is for holding the shaft 16.

The flange 40 has four fixing holes, through which bolts 43 are inserted respectively so as to fix the base member 27 to the casing 14. The base members 27 are respectively arranged on the lattice points.

The bearing 41 is mounted above the flange 40 and has a bearing mechanism on its upper part. Specifically, the bearing 41 employed in this embodiment has a ring (or annular) groove on the upper part, which is defined laterally by an outer and an inner cylindrical walls, which are arranged coaxially. A number of balls are placed in the ring groove. The outer cylindrical wall has an outer diameter being substantially the same as an inner diameter of the recess 21 of the converting member 4, so that the bearing 41 fits in the recess 21. Thereby, the converting member 4 is allowed to horizontally pivot relative to the bearing 41, so as to move in substantially the same plane as the rectilinearly-movable member 6.

The shaft holder 42 is a cylinder having an outer diameter being substantially the same as an inner diameter of the inner cylindrical wall of the ring groove and a height being substantially the same as that of the holding cover 5. The shaft holder 42 has substantially the same diameter as that of the holding hole 38 of the converting member 4.

Further, the shaft holder 42 has a groove 44 diametrically penetrating and having a width of substantially the same as an outer diameter of the shaft 16. In this embodiment, the base members 27 are arranged so that the shafts 16 pass through the grooves 44 in the X direction at the lattice points "tm" and "um" and that the shafts 16 pass through the grooves 44 in the Y direction at the lattice points other than "tm" and "um". The shaft holder 42 has two fixing holes 47 on its top face, which is for fixing the holding cover 5.

Next, an assembly structure of the transfer device 1 in this embodiment will be described in detail below.

Referring to FIG. 1, the transfer device 1 in this embodiment is located at a position where the main conveyor line 65 and the subsidiary conveyor line 66 intersect, thereby being configured to transfer articles to any of the conveyor lines 65 and 66. The transfer device 1 aligns the rollers 9 to form the latticework (see FIG. 2) with the shafts 16 of the rollers 9 supported at the respective lattice points. Specifically, each of the shafts 16 has the shaft bearings 17, which are supported by the converting member 4 located at the lattice point and held by the holding cover 5. The shaft bearing 17 is guided by the guiding part 48 of the holding cover 5, so that the converting members 4 perform smooth lifting motion of the rollers 9.

Herein, some shafts 16 have the sprockets 18, over which the chains 7 are looped.

Specifically, in the X group of rollers 19, each chain 7 is looped over any two sprockets 18 located upstream of the lattice points "sj", "tj", "uj", and "wj" in the Y direction and adjacent to each other in the X direction. More specifically, one chain 7 is looped over the sprocket 18 at the lattice point "sj" and near the bearing 17 and the sprocket (not shown) provided at the driving device 3a. Another chain 7 is looped over the sprocket 18 at the lattice point "sj" and away from the bearing 17 and the sprocket 18 at the lattice point "tj" and away from the bearing 17. Still another chain 7 is looped over the sprocket 18 at the lattice point "tj" and near the bearing 17 and the sprocket 18 at the lattice point "uj" and near the bearing 17. Yet another chain 7 is looped over the sprocket 18 at the lattice point "uj" and away from the bearing 17 and the sprocket 18 at the lattice point "wj" and away from the bearing 17. Such an arrangement conveys rotation of the driving device 3a to the rollers 9 aligned in the X direction.

Further, the adjacent rollers 9 in the Y direction, as shown in FIGS. 5 and 6, rotate all together because of the shafts 16 connected to one another. Consequently, rotation of the driving device 3a is conveyed via the chains 7 and the shafts 16 so as to rotate all the rollers 9 in the X group 19.

Meanwhile, in the Y group of rollers 20, the sprockets 18 are arranged at one ends of the rollers 9. Each chain 7 is looped over any two sprockets 18 adjacent to each other in the Y direction. More specifically, the rollers 9 between the rows "s" and "t" have the sprockets 18 near the row "t", respectively. The rollers 9 between the rows "t" and "u" have the sprockets 18 near the row "u", respectively. The rollers 9 between the rows "u" and "w" have the sprockets 18 near the row "u", respectively.

As to the rollers 9 between the rows "s" and "t", one chain 7 is looped over the sprocket 18 at the lattice point "tj" and near the body 28 and the sprocket 18 at the lattice point "tk" and near the body 28. Another chain 7 is looped over the sprocket 18 at the lattice point "tk" and near the bearing 17 and the sprocket 18 at the lattice point "tl" and near the bearing 17. Still another chain 7 is looped over the sprocket 18 at the lattice point "tl" and near the body 28 and the sprocket 18 at the lattice point "tm" and near the body 28. The chains 7 are looped over any two sprockets 18 of the rollers 9 between the rows "t" and "u" and of the rollers 9 between the rows "u" and "w" in the same manner as of the rollers 9 between the rows "s" and "t", and thus, descriptions thereof are omitted. Such an arrangement enables simultaneous rotation of the rollers 9 aligned in the Y direction.

The driving device 3b for driving the Y group of rollers 20 has a sprocket (not shown), over which a chain 7 is looped so as to interlock the sprocket (not shown) with the sprocket 18 of the roller 9 between the rows "t" and "u" and in the column "m". Shortly, the chain 7 is looped over the sprocket (not shown) of the driving device 3b and the sprocket 18 at the lattice point "urn" and near the bearing 17. Further, the roller 9 between the rows "t" and "u" and in the column "m" has the shaft 16, whose both ends are connected to the shafts 16 of the adjacent rollers 9 in the X direction. Consequently, rotation of the driving device 3b is conveyed via the chains 7 and the shafts 16 so as to rotate all the rollers 9 in the Y group 20.

The transfer device 1 in this embodiment has the above-mentioned structure at the lattice points, so as to prevent the rollers 9 of the X group 19 and the rollers 9 of the Y group 20 from interfering with each other. Specifically, with the shafts 16 of the rollers 9 constituting the X group 19 connected to one another across the lattice points, the shafts 16 of the rollers 9 constituting the Y group 20 are arranged so as not to be across the lattice points for eliminating overlap with the shafts 16 of the X group of rollers 19. Such an arrangement smoothly changes a conveying direction of an article because both groups keep out of each other even when the lifting part 13 performs a lifting motion.

Further, the converting members 4 provided in the lifting part 13 are located below the shaft bearings 17 of the rollers 9 at the lattice points. As described above, pairs of the rotation converting parts 35 of the converting members 4 face each other between the rows "s" and "t" and between the rows "u" and "w". Specifically, the insertion holes 37 of each pair of the rotation converting parts 35 facing each other are slidably bolted on the respective holding holes 34 of the holding plate 8 disposed in the rectilinearly-movable member 6. The rotation converting parts 35 pivot with drawing an arcuate track around the center of the lifting-motion transmitting part 36 in accordance with a rectilinear motion of the rectilinearly-movable member 6. The rotation converting parts 35 pivot in substantially the same plane as that including a track of the rectilinear motion of the rectilinearly-movable member 6. In other words, the lifting part 13 constituted by the converting members 4 and the rectilinearly-movable members 6 has a practical height equal to a thickness of the both members 4 and 6 brought together.

Herein, the rectilinearly-movable members 6 each are located at a position where the converting members 4 face each other. Each of the members 6 holds eight converting members 4 in total. To the ends of the rectilinearly-movable members 6 near the column "m" each, the other end of the bar 31 of the rack and pinion 10 for outputting drive power of the driving device 2 is connected.

Each of the lifting-motion transmitting parts 36 of the converting members 4 is arranged in contact with the shaft bearing 17 at the lattice point so that turning of the lifting-motion transmitting part 36 makes the shaft bearing 17 to come to the recess (low-placed supporting part) 39 or to a portion (high-placed supporting part) other than the recess 39. The shaft holder 42 of the base member 27 is inserted in the holding hole 38 of the converting member 4, with the bearing 41 of the base member 27 fitted in the recess 21 of the converting member 4. The flange 40 of the base member 27 is fixed to the bottom of the casing 14 at each lattice point. The groove 44 of the shaft holder 42 of the base member 27 is arranged, as described above, so as to hold the connection of the adjacent shafts 16.

Next, an operation of the transfer device 1 in this embodiment will be described in detail below.

The transfer device 1 transfers articles to the main conveyor line 65 or the subsidiary conveyor line 66 with controlling a conveying direction by a controller (not shown). By the transfer device 1, articles are controlled to be conveyed by either the X group of rollers 19 or the Y group of rollers 20.

Specifically, in a case of conveyance of an article in the main conveyor line 65 shown in FIG. 1, the transfer device 1 arranges the X group of rollers 19 at the upper position so as to convey the article. At this time, even though the presence sensor 11 detects the article having been placed on the transfer device 1, the article is conveyed downstream of the main conveyor line 65 connected to the transfer device 1 without stopping of driving of the driving device 3a for driving the X group of rollers 19. During conveyance by the X group 19, the Y group of rollers 20 waits below the X group of rollers 19.

Figure 13A:
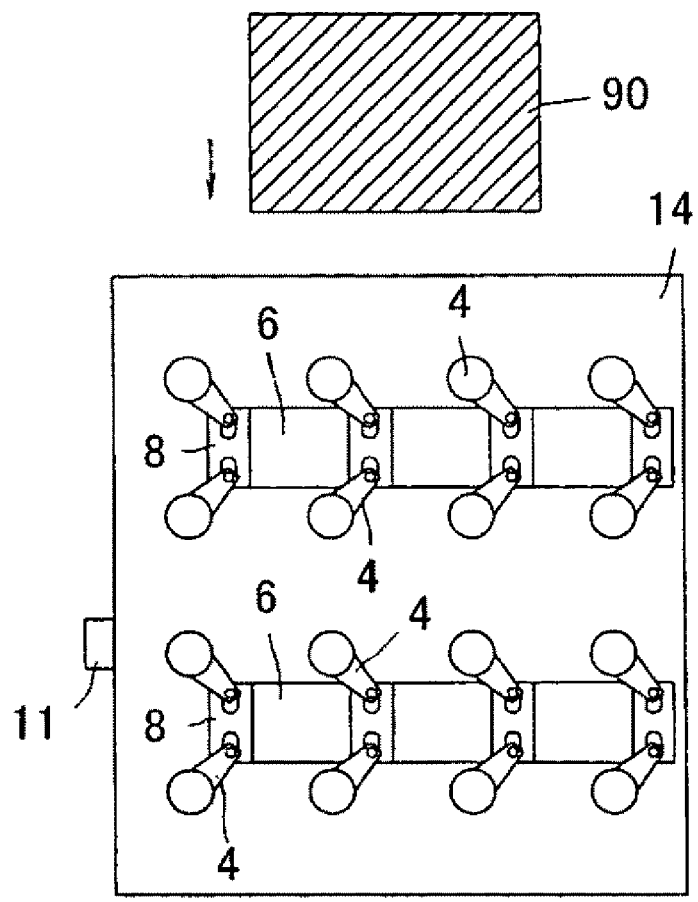
FIGS. 13A and 13B are explanatory diagrams for explaining a series of conveying operations of an article by the transfer device of the embodiment of the present invention before the article is carried in the device.
Figure 13B:
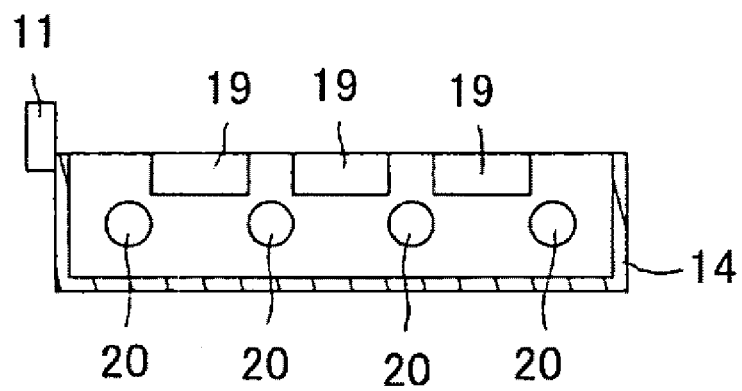
Figure 14A:
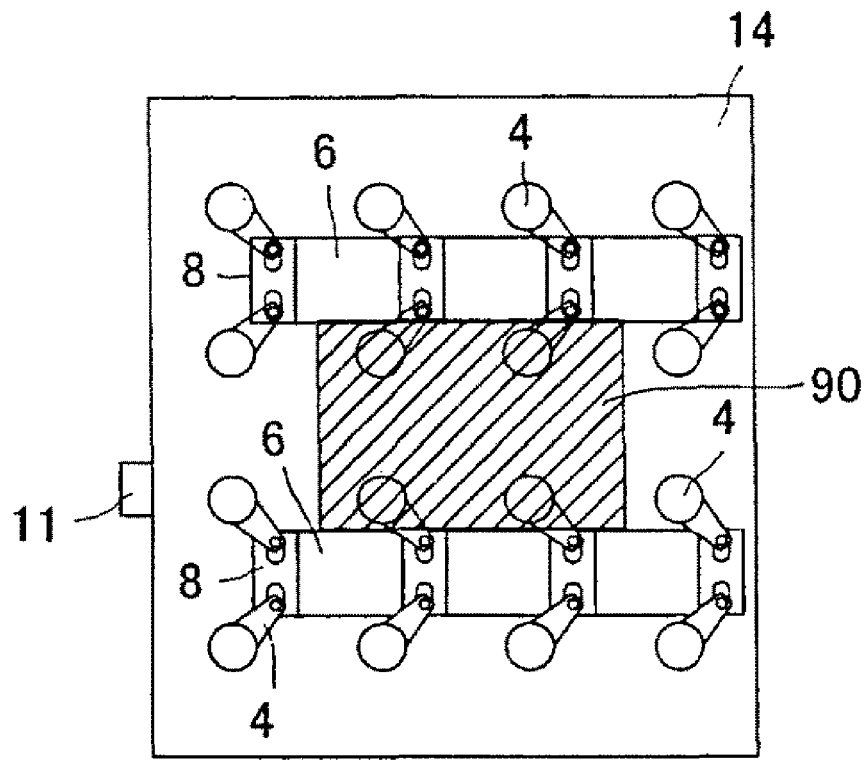
FIGS. 14A and 14B are explanatory diagrams for explaining the series of conveying operations of the article by the transfer device when the article stops at a predetermined position.
Figure 14B:
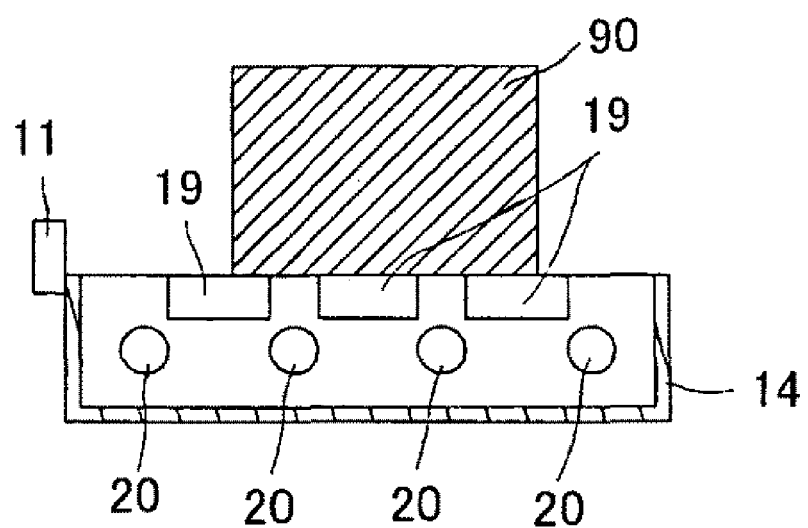

On the other hand, in a case of conveyance of an article in the subsidiary conveyor line 66 shown in FIG. 1 by changing of a conveying direction by the transfer device 1, as shown in FIGS. 13A to 16B, the lifting part 13 is controlled. Referring to FIGS. 13A and B, when an article 90 is conveyed to the transfer device 1 upon reading of the conveying direction of the article 90 by a sensor (not shown) provided in the conveyor unit 60 adjacent to and upstream of the transfer device 1, the article 90 is conveyed to a position corresponding to the presence sensor 11 by the X group of rollers 19. When the presence sensor 11 detects the article 90 having been placed on the transfer device 1, the article 90 stops at a position shown in FIGS. 14A and B. At this time, the driving device 3a is stopped and thus the upstream conveyor line is also stopped.

Figure 15A:
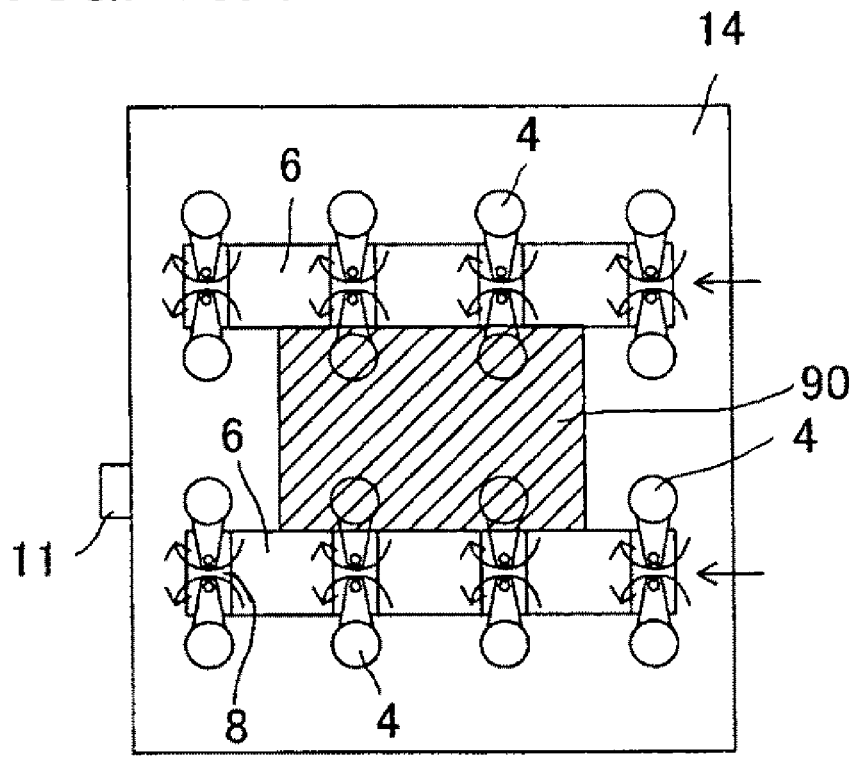
FIGS. 15A and 15B are explanatory diagrams explaining the series of conveying operations of the article by the transfer device when all the rollers are situated at the same level.
Figure 15B:
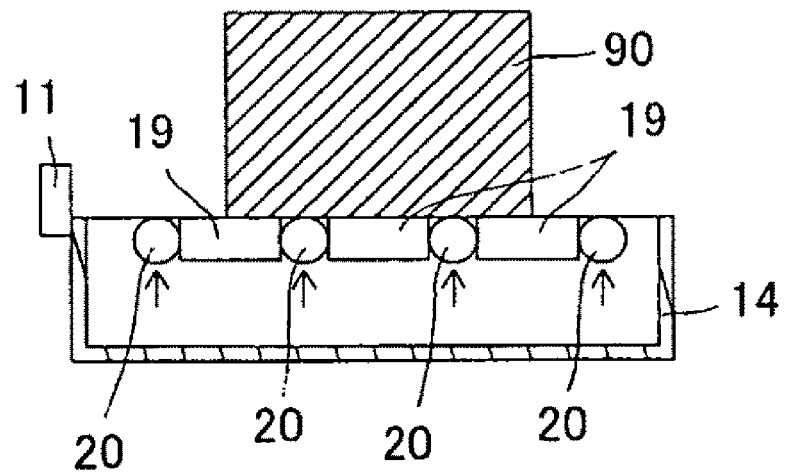

With the driving device 3a stopped, the driving device 2 of the lifting part 13 is driven. A rectilinear motion of the driving device 2 is inputted via the racks and pinions 10 to the rectilinearly-movable members 6, so as to be converted to a rotational motion by the converting members 4. That is, as shown in FIG. 15A, the rotation converting parts 35 of the converting members 4 pivot around the centers of the lifting-motion transmitting parts 36 with drawing arcuate tracks. The rotational motion of the converting members 4 is converted to a lifting motion because of difference in height, which is generated by the recesses 39 of the converting members 4. When the lifting motion is transmitted to the shafts 16 of the rollers 9, the Y group of rollers 20 is lifted up to come level with the X group of rollers 19 (FIG. 15B). That eliminates an operation for lifting up the article 90 by the driving device 2.

Figure 16A:
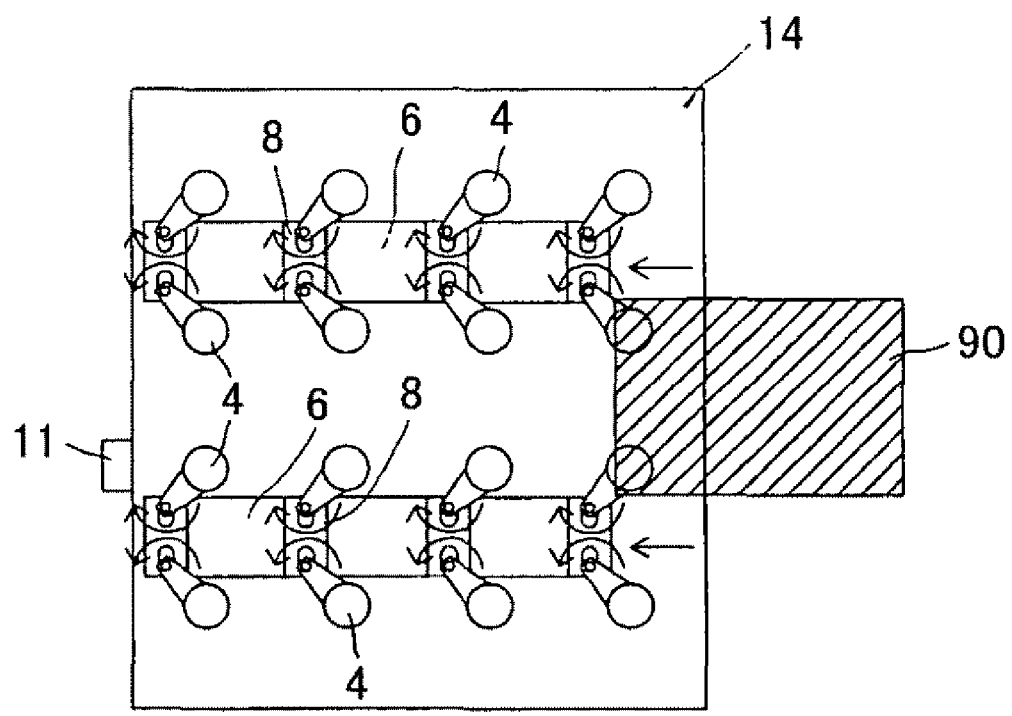
FIGS. 16A and 16B are explanatory diagrams explaining the series of conveying operations of the article by the transfer device when the article is being carried out of the device.
Figure 16B:
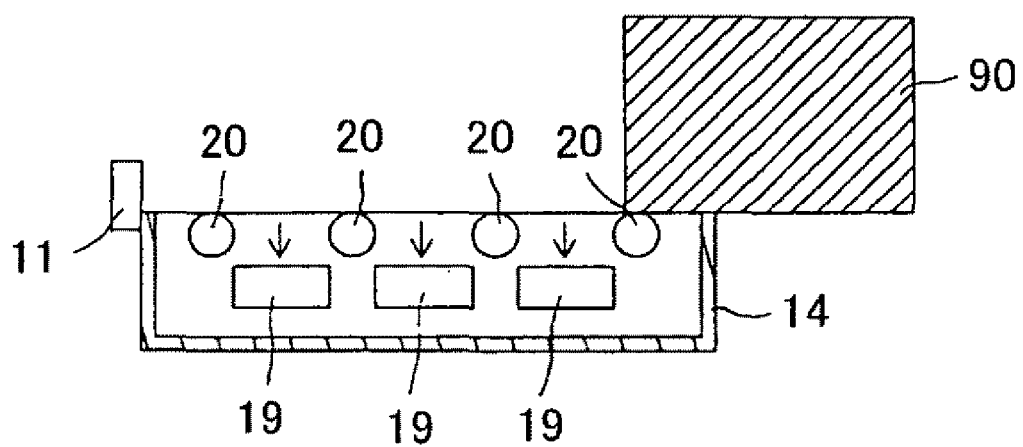

A further rectilinear motion of the rectilinearly-movable members 6 let the X group of rollers 19 down because of the lifting motion transmitted by the converting members 4, thereby rendering only the Y group of rollers 20 at the upper position (FIGS. 16A and 16B). Shortly, the X group 19 and the Y group 20 switch positions from the state shown in FIGS. 13A and B. Then, the driving device 2 of the lifting part 13 is stopped and in turn the driving device 3b for driving the Y group of rollers 20 is driven, so that the article 90 is conveyed downstream of the subsidiary conveyor line 66 connected to the transfer device 1.

Consequently, the transfer device 1 and the conveyor 55 equipped with the same in this invention prevent heightening of an area required for arrangement of the lifting part 13 as been done in the known art because the plate-like rectilinearly-movable members 6 and the converting members 4, which constitute the lifting part 13, make a rectilinear motion and a rotational motion at substantially the same plane and further the rotational motion is converted to a lifting motion to be transmitted to the rollers 9 by using difference in height of the converting members 4. Further, there is no need to arrange the driving device 2 below the conveying part 12 by such a mechanism that the rectilinear motion is converted to the rotational motion and further to the lifting motion to be transmitted. That means there is no need to add a height of the driving device 2 for lifting to a total height of the transfer device 1. Thus, the transfer device 1 in this embodiment practically has a total height of the diameter of the rollers 9 and a height enough to lift up and down the rollers 9. Therefore, the transfer device 1 in this embodiment ensures a reduced thickness as compared to one in the known art.

Further, the transfer device 1 and the conveyor 55 equipped with the same in this embodiment have such a configuration in which the X group of rollers 19 and the Y group of rollers 20 are temporality on the same level in lifting up of either group. Because either group is lifted down after the both groups have been on the same level, large drive power is not necessary for the driving device 2 for driving the lifting part 13. Thus, by the transfer device 1 in this embodiment, the driving device 2 for lifting having small drive power suffices even when the transfer device 1 is used in a conveyor line that conveys heavy articles. That is, a small size of the driving device 2 ensures saving space of the areas required for arrangement of the lifting part 13. Since the driving device 2 employed in this embodiment can be placed anywhere only if not obstructing conveyance, the transfer device 1 prevents from heightening in total by arrangement of the driving device 2 at the same level with the conveying part 12. Consequently, the transfer device 1 in this invention dispel the uneasiness of workers in placing of articles on a conveyor line or in product assembly on a conveyor line even when being arranged in an assembly line for conveying high and heavy articles or a storage line of products in a warehouse.

Figure 17:
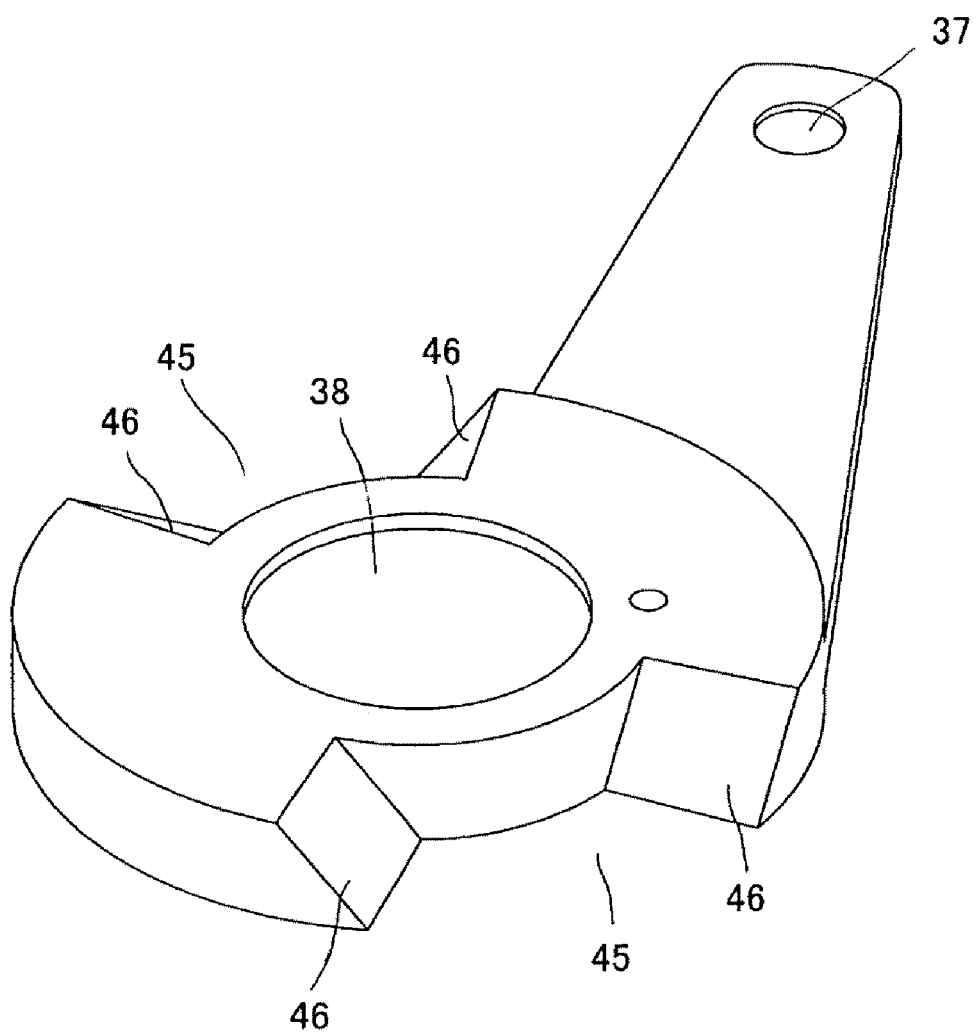
FIG. 17 is a perspective view of a modified embodiment of the converting member.

The above-mentioned embodiment employs the converting member 4 with the recesses 39, but the present invention is not limited thereto and may employ a converting member with cutout portions 45, as shown in FIG. 17. In this case, a thinner lifting-motion transmitting part 36 allows a total height of the device 1 shorter.

The above-mentioned embodiment arranges the subsidiary conveyor line 66 connected to the transfer device 1 only in one direction, but the present invention is not limited thereto and may arrange the subsidiary conveyor lines 66 connected in two directions. In this case, the rollers 9 constituting the Y group 20 require a configuration for performing normal rotation and reverse rotation.

The above-mentioned embodiment employs the roller incorporating a motor as the driving device 2 for lifting, but the present invention is not limited thereto and may employ a pneumatic or hydraulic actuator as the device 2. Such an arrangement dispenses with the racks and pinions 10 because the rectilinearly-movable members 6 directly receive a rectilinear motion.

The invention claimed is:

1. A transfer device comprising:
    a conveying part having a plurality of rollers for conveying articles; and
    a lifting part for lifting up and down the conveying part between an upper position and a lower position below the upper position,
    the rollers consisting of a first group of rollers and a second group of rollers, the first group of rollers being configured to convey articles in a first direction and the second group of rollers being configured to convey articles in a second direction intersecting with the first direction, so that the first and second groups of rollers are aligned in rows and columns to form a latticework,
    the rollers each being supported on shafts by its both ends at lattice points of the latticework,
    wherein the lifting part comprises a power source for lifting up and down, rectilinearly-movable members each performing a reciprocating rectilinear motion powered by the power source, and converting members arranged at the respective lattice points,
    the converting members each being configured to convert the rectilinear motion of the rectilinearly-movable member to a rotational motion and to convert the rotational motion to a lifting motion so as to transmit the lifting motion to the rollers, and
    the converting members being configured to lift up and down the first group of rollers concurrently between the upper position and the lower position and to lift up and down the second group of rollers concurrently between the upper position and the lower position,
    so that the first group of rollers forms a flat surface when being positioned at the upper position and the second group of rollers form another flat surface when being positioned at the upper position.

2. The transfer device as defined in claim 1,
    the rollers of the both groups each having a main body and a shaft extending outwardly in an axial direction from both ends of the main body,
    the converting members each having a lifting-motion transmitting part supporting the shafts of the first and second groups of rollers,
    the lifting-motion transmitting parts each having a high-placed supporting part and a low-placed supporting part and being configured to turn with supporting the shafts of the rollers by one selected from the high-placed supporting part and the low-placed supporting part, and
    the rollers being positioned at the upper position when the shafts are supported by the high-placed supporting part and at the lower position when the shafts are supported by the low-placed supporting part,
    so that turning of the lifting-motion transmitting parts allows the shafts of one selected from the first and second groups of rollers to be supported by the low-placed supporting parts after the shafts of both the first and second groups of rollers have been supported by the high-placed supporting parts.

3. The transfer device as defined in claim 2,
    the shafts each being provided with shaft bearings rotatable relative to the shaft,
    the shaft bearings each being placed on the lifting-motion transmitting part so as to rotate along with turning of the lifting-motion transmitting part.

4. The transfer device as defined in claim 2,
    the converting members each further having a rotation converting part engaged with the rectilinearly-movable member, and
    the rotation converting part being configured to make a reciprocating pivot motion interlocked with the reciprocating rectilinear motion of the rectilinear-movable member with drawing an arcuate track around a center of the lifting-motion transmitting part, the pivot motion being performed in substantially the same plane as an imaginary plane including a track of the reciprocating rectilinear motion.

5. The transfer device as defined in claim 1,
    the power source being composed of a tubular body with a rotational shaft and a motor incorporated in the body so as to rotate the rotational shaft by driving of the motor and being situated at substantially the same level as the first and second groups of rollers of the conveying part.

6. The transfer device as defined in claim 5,
    further comprising a rack and pinion for converting a rotational motion powered by the power source to the rectilinear motion so as to output the rectilinear motion to the rectilinearly-movable member.

7. The transfer device as defined in claim 5,
    the rollers of the both groups each having a shaft with both ends each selected from: (1) an end located within an area of the lattice point; (2) an end communicating with an end of its adjacent roller belonging to the same row or the same column of the latticework across the lattice point; and (3) an end located out of the area of the lattice point, and
    the shaft of each roller rotating in synchronization with the main body of the roller.

8. The transfer device as defined in claim 1,
    some of the shafts of the rollers each having a power transmission member for transmitting power having been transmitted to the roller to its adjacent roller,
    so that rotation of one roller in the first group upon power transmission rotates other rollers in the first group interlocked therewith via the power transmission members, and
    so that rotation of one roller in the second group upon power transmission rotates other rollers in the second group interlocked therewith via the power transmission members.

9. The transfer device as defined in claim 8,
    the power transmission member being a sprocket,
    at least a pair of adjacent rollers having the sprockets respectively, over the sprockets a power-transmitting chain is looped.

10. The transfer device as defined in claim 2,
    further having holding covers for covering the lifting-motion transmitting parts, the holding covers each having a guide for guiding the rollers to move in a lifting direction.

11. The transfer device as defined in claim 1,
further having base members arranged in the lattice points respectively,
the base members each having a thrust bearing for horizontally turnably supporting the converting member and a shaft holder for holding the shaft of the roller.

12. The transfer device as defined in claim 1,
further having a power source for conveyance for outputting drive power to the rollers,
the power source for conveyance being configured to rotate at least one roller of one selected from the first and second groups.

13. The transfer device as defined in claim 12,
being configured to stop outputting the power to the rollers from the power source for conveyance at least during driving of the power source for lifting.

14. The transfer device as defined in claim 2,
the rollers of the both groups each having a shaft with both ends each selected from: (1) an end located within an area of the lattice point; (2) an end communicating with an end of its adjacent roller belonging to the same row or the same column of the latticework across the lattice point; and (3) an end located out of the area of the lattice point, and
the shaft of each roller rotating in synchronization with the main body of the roller.

15. A conveyor comprising:
a plurality of conveyor lines branched at a branch point;
a controller for controlling conveyance by the conveyor lines;
a sensor for sensing conveyance information of articles on the conveyor lines; and
the transfer device as defined in claim 1 and arranged at the branch point of the conveyor lines.

16. The transfer device as defined in claim 1,
rollers in each of the first and second groups of rollers in the upper position situated to directly engage and convey articles.

* * * * *